Feb. 26, 1929.

L. C. DOANE 1,703,482

SWIVEL JOINT

Filed June 23, 1926

INVENTOR
Leroy C. Doane
BY
his ATTORNEY

Patented Feb. 26, 1929.

1,703,482

UNITED STATES PATENT OFFICE.

LEROY C. DOANE, OF MERIDEN, CONNECTICUT, ASSIGNOR TO THE MILLER COMPANY, OF MERIDEN, CONNECTICUT, A CORPORATION OF CONNECTICUT.

SWIVEL JOINT.

Application filed June 23, 1926. Serial No. 117,978.

The present invention relates to swivel joints, and is more particularly directed toward a swivel joint suitable for use in electrical apparatus for adjustably supporting some movable part of the apparatus and at the same time housing lead wires.

An object of the present invention is to provide a swivel joint suitable for use in supporting bridge lamp shades, and other devices, which joint is made of simple, inexpensive parts capable of easy assembly.

More particularly, an object of the present invention is to provide a swivel joint whose cooperative movable parts are made out of sheet metal stampings.

The accompanying drawings show, for purposes of illustration, one of the many possible embodiments in which the present invention may take form, it being understood that the drawings are illustrative of the invention rather than limiting the same.

Figure 1:
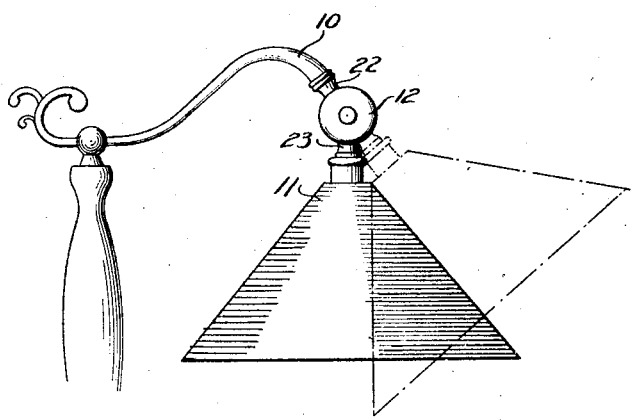
Figure 1 is a side elevational view of a bridge lamp equipped with the present form of swivel joint.

As shown in Figure 1, (which merely illustrates one of the many uses of the present form of swivel joint) a bridge lamp arm 10 supports a socket and shade indicated at 11 by the swivel joint 12 to be described in detail.

Figure 2:
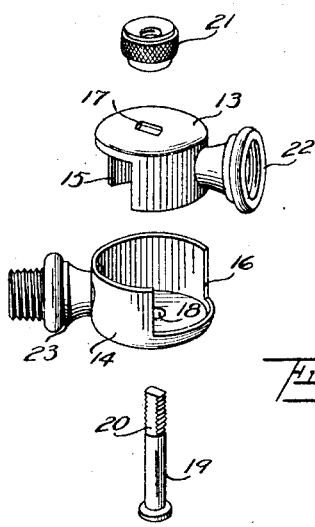
Figure 2 is a perspective view of the joint showing the parts separated from one another.
Figure 3:
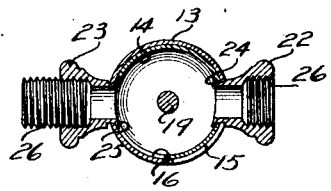
Figure 3 is a sectional view of the same.

In making up the joint 12, a pair of cup-shaped sheet metal stampings are made up of such size that the cylindrical side walls of one stamping will just fit inside those of the other stamping. As shown in Figures 2 and 3, these cup-shaped stampings 13 and 14 have cut away side walls as indicated at 15 and 16 respectively. The smaller stamping 13 is provided with a non-circular hole 17 while the larger stamping has a round hole 18. A bolt 19 passes loosely through the round hole 18 and has a non-circular end portion 20 to cooperate with the hole 17. A nut 21 is used for holding the parts in place.

When used in a bridge lamp, these stampings are each provided with tubular wire carrying members as shown at 22 and 23. These members are easily attached to the stampings by upsetting the metal as indicated at 24 and 25 in Figure 3. These members may be threaded as shown at 26 for the attachment of nipples, lamp sockets, or other parts. The cut out 16 in the larger cup-shaped stamping accommodates the outwardly extending tubular member 22 on the small stamping, while the cut out 15 in the smaller stamping accommodates the wire passing through the tubular member 13.

In assembling electrical apparatus using these swivel joints, the wire may be readily passed through the parts. The stampings may be separated as illustrated in Figure 2 and reassembled if necessary without affecting the wires. Owing to the shape of the stampings the parts have ample strength in all directions. One may readily adjust the joint without the use of tools. Tightening the nut 21 will increase the friction, and thereby one may adjust the angle of the lamp. There is little tendency for the nut to loosen when the joint is adjusted.

It is obvious that the invention may be embodied in many forms and constructions, and I wish it to be understood that the particular form shown is but one of the many forms. Various modifications and changes being possible, I do not limit myself in any way with respect thereto.

What is claimed is:

1. In a swivel joint, two cup-shaped sheet metal stampings having their side walls telescoped together, an outwardly projecting member carried by the one stamping and extending through a cut away portion of the side wall of the other stamping.

2. In a swivel joint, two cup-shaped sheet metal stampings having their side walls telescoped together, an axially disposed threaded bolt passing through both stampings, one stamping being rotatable relative to the bolt and the other nonrotatable, and a nut for clamping the parts together.

3. In a swivel joint, in combination, a pair of sheet metal stampings having telescopically disposed cylindrical side walls, an outwardly projecting tubular member attached to the side wall of each stamping, one of the stampings being cut away to permit the tugular member carried by the other stamping to pass therethrough.

4. In a swivel joint, in combination, a pair of sheet metal stampings having telescopically disposed cylindrical side walls, an outwardly projecting tubular member attached to the side wall of each stamping, one of the stampings being cut away to permit the tubular member carried by the other stamping to pass therethrough, the side wall of said other stamping being cut away to accommodate wires passed through the tubular member carried by the first stamping.

5. In a swivel joint, in combination, a pair of sheet metal stampings having telescopically disposed cylindrical side walls, an outwardly projecting tubular member attached to the side wall of each stamping, one of the stampings being cut away to permit the tubular member carried by the other stamping to pass therethrough, the side wall of said other stamping being cut away to accommodate wires passed through the tubular member carried by the first stamping, and an axially disposed bolt for fastening the stampings together.

6. In a swivel joint, in combination, a pair of sheet metal stampings having telescopically disposed cylindrical side walls, an outwardly projecting tubular member attached to the side wall of each stamping, one of the stampings being cut away to permit the tubular member carried by the other stamping to pass therethrough, the side wall of said other stamping being cut away to accommodate wires passed through the tubular member carried by the first stamping, and an axially disposed bolt for fastening the stampings together, the bolt being non-rotatably connected with one of the stampings.

Signed at Meriden, in the county of New Haven and State of Connecticut, this 11th day of June, 1926.

LEROY C. DOANE.